United States Patent [19]
Kivimaa

[11] 3,839,927
[45] Oct. 8, 1974

[54] SWAGING MACHINE
[76] Inventor: Eero Mikael Kivimaa, Linnankoskenkatu 15, 00250 Helsinki 25, Finland
[22] Filed: June 15, 1972
[21] Appl. No.: 263,203

[30] Foreign Application Priority Data
June 21, 1971 Sweden.............................. 8063/71

[52] U.S. Cl. ................................................ 76/54
[51] Int. Cl............................................ B23d 63/06
[58] Field of Search......................................... 76/54

[56] References Cited
UNITED STATES PATENTS
2,528,925  11/1950  Vigneau............................ 76/54 X
3,416,394  12/1968  Stier et al. ......................... 76/54 X Primary Examiner—Harrison L. Hinson
Attorney, Agent, or Firm—Fleit, Gripple & Jacobson

[57] ABSTRACT

A swag machine in which the back of the saw blade to be swaged is arranged to rest on a movable saw blade carriage with the sides of the saw blade being supported by side pressing elements. Swaging is effected by a turnable eccentric die in cooperation with an anvil with spring devices being arranged to pose forces on the saw blade through a saw blade carriage and the side pressing elements. The forces press the saw tooth to be swaged against the swaging eccentric die and the anvil with the spring devices being adjustable to the construction of the saw blade.

10 Claims, 14 Drawing Figures

PATENTED OCT 8 1974    3,839,927

SWAGING MACHINE

In hand-swaging devices the fixing of the blade is accomplished usually by a powerful side pressing screw, which in order to prevent sliding is provided on its end with protrusions thereby damaging the blade. In some machines a smooth side presser is used, but the force required in the presser is so large that the construction of the machine becomes heavy. Also, if tooth changing is done in such a manner that the swaging die each time is drawn to the side when the blade is moved, the design of the machine becomes complicated. It is known to use a system where the side presser only partly takes part in holding the blade in position, while the main part of the holding power is due to a blade carriage with adjustable working distance, against which the blade back is resting. For tooth switching the blade carriage and the blade move backwards each time about 1.5 cm, so that the point of the next tooth can be moved between the eccentric die and the anvil. This system has successfully been applied in a new one-stage swaging method as disclosed in applicant's U.S. Pat. No. 2,985,039 and West German Pat. No. 1,161,107. This method also has a drawback, namely, if the width of the blade varies a little, or the user of the machine adjusts the distance of the blade carriage a little too small, the pressing power as the blade carriage moves to "closed position" may become too large, so that the swaging die is strained more than necessary and its life shortens.

The present invention aims at eliminating this drawback and developing further the system of fastening the blade. Also the blade is held in position during swaging mainly by the blade carriage, which is pressed against the blade by a force exactly adjusted by means of a spring arrangement. The adjustable force of another spring arrangement affects the side presser so as to center the tooth being swaged and take part in holding the blade. After finished swaging the machine opens the side presser and the blade carriage by somewhat pressing the spring arrangement together, so that the blade carriage moves backwards only about 2 mm. The eccentric die can now be turned to its original position and switching of the tooth carried out. This is done by drawing the blade carriage backwards a further 1.5 cm about, and pushing at the same time the new tooth to a correct place escaping the die, upon which the blade carriage and the tooth mover are returned to their original positions. Then the machine is brought to "closed" position by releasing the spring arrangements again to press the blade by means of the blade carriage and the side presser and new swaging is carried out by turning the eccentric die.

In the machine according to the present invention the movements of the eccentric die and the opening and closing of the holding organs of the blade as well as the mutual programming of the movements are derived from the reciprocating motion of the driving bar in the machine. Again the movements necessary for shifting tooth, the reciprocating escape motion — about 1.5 cm long — of the blade carriage, and the reciprocating pushing motion of the tooth mover, are derived from the motion of the transferring bar of the machine. The automatic operation of the machine thus requires only two pressure-air cylinders — for instance electrically programmed — a main cylinder for moving the driving bar of the machine and a smaller cylinder for the transferring bar.

The invention is illustrated by the enclosed partly schematical drawings. These present the invention applied to an automatic swaging machine accomplishing the one-stage swaging method previously presented by the inventor. In this machine the blade is in vertical position during swaging, and the machine is just as well suited for swaging frame saw blades, band saw blades, and circular saw blades.

BRIEF DESCRIPTION OF THE DRAWINGS

FIG. 1a discloses a rear elevational view partially in cross section of the saw blade and swaging members, during the process of swaging;

FIG. 1b shows a side view partially in cross section of the side of the saw blade shown in FIG. 1a;

FIG. 7b is a cross sectional view taken along line D—D of FIG. 7a;

DETAILED DESCRIPTION OF THE DRAWINGS

Figures 1A, 1B:
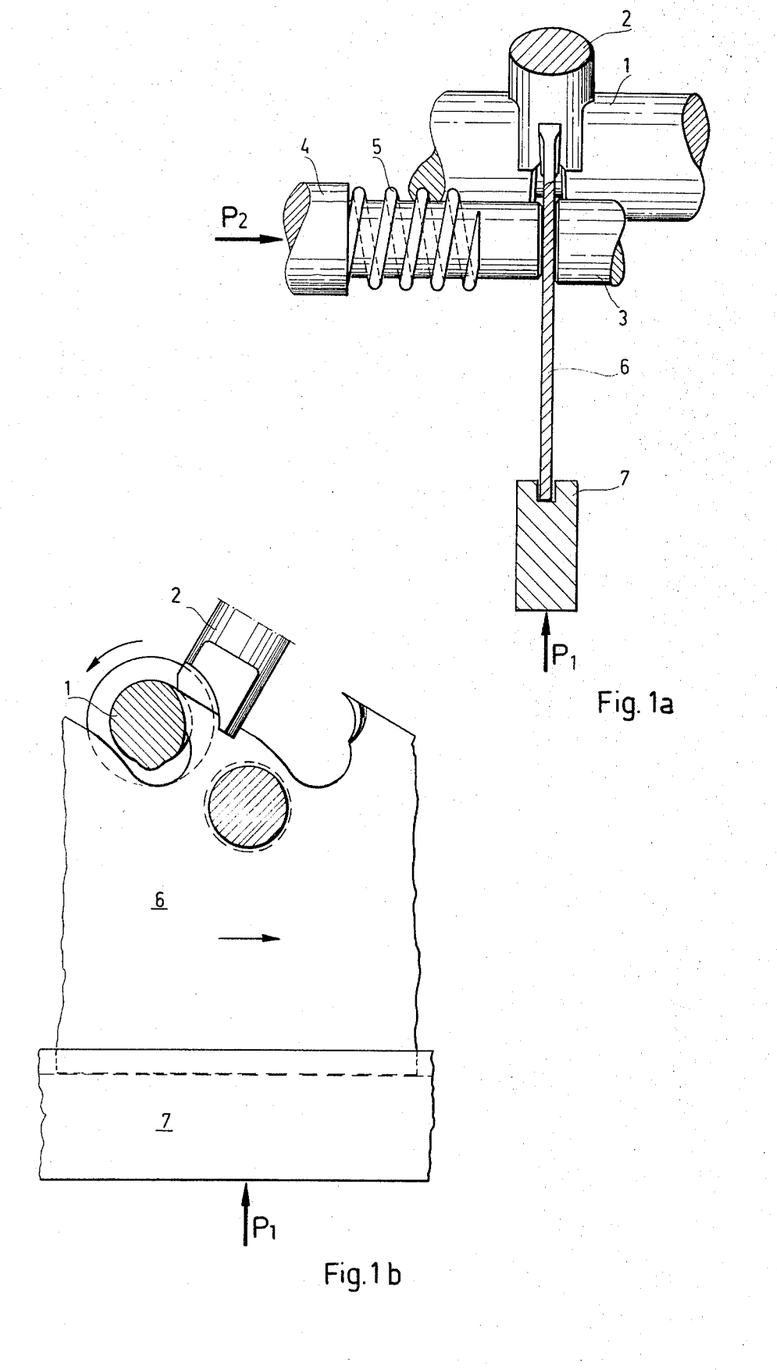

In FIG. 1 the part 1 shows the swaging die according to the U.S. Pat. No. 2,985,039 and German Pat No. 1,161,107 provided with side limit stops, 2 the anvil, 3 the side support, fixed but adjustable according to the thickness of the blade, 4 the movable side support, and 5 the opening spring of the side support. All the parts mentioned are situated within the swaging head missing from the figure. Designation 6 presents the saw blade being swaged, and designation 7 the blade holder fastened to the blade carriage missing in the figure. The power $P_1$ means the power transmitted from the spring arrangement to the back of the blade or the center of the circular saw blade, which presses the tooth against the eccenter 1 and the anvil 2, and the power $P_2$ means the power from the other spring arrangement transmitted to the side presser 4. During swaging when the eccenter 1 is turned in the direction of the arrow the tooth is able to move a little between the swaging members and the flexible holding members. Extensive tests have shown that the best swaging results are achieved by the right choice of powers $P_1$ and $P_2$. These are dependent of the thickness and hardness of the blade, the tooth angles, the extent of swaging, as well as whether swaging is carried out by one or several successive movements of the die. As an example of the order of size it can be mentioned that in one case swaging of 2.4 mm thick frame saw blade with two swaging movements gave a nice and large swaging, when power $P_1$ was chosen about 1,800 kp and $P_2$ about 900 kp.

At first the elements of the machine used for transmitting the adjustable powers $P_1$ and $P_2$ from the spring arrangements to the blade, the spring arrangements themselves, and the "opening" and "closing" of these elements, are described below. Thereafter follows a description of the elements used for moving the eccentric die, the holding of the blade and the programming of the swaging movements, as well as deriving the movements from the driving bar of the machine. Finally the elements of the machine required for switching tooth is described as well as deriving their movements from the transferring bar of the machine.

Figure 2:
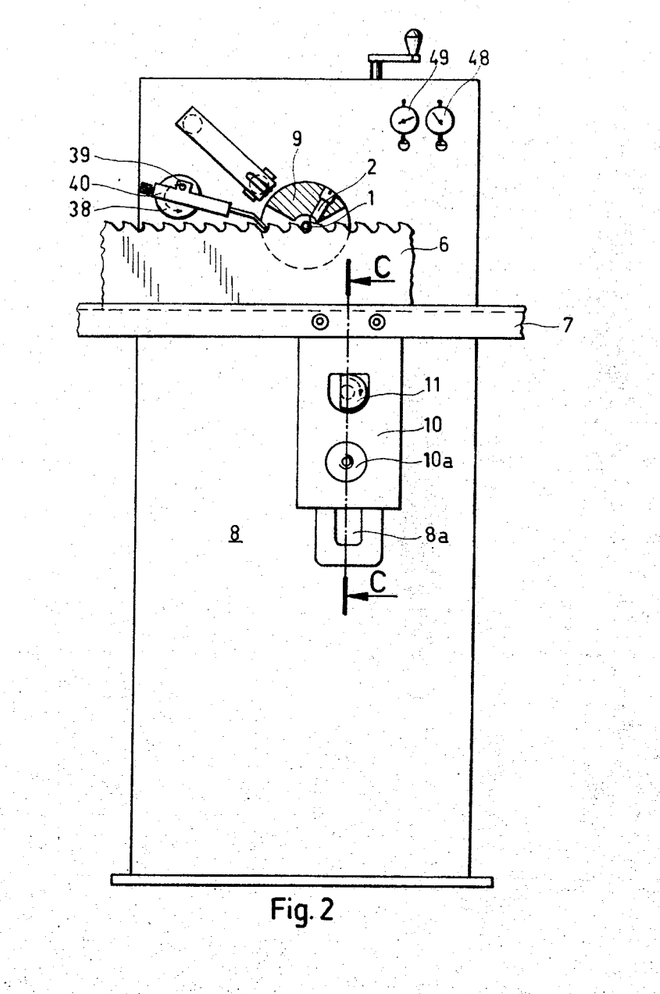
FIG. 2 shows a front elevational view of the swaging machine according to the invention.

In the enclosed figures designation 8 is the welded or cast body of the machine. In its upper part the swaging head 9 is located with the previously described members 1–5 inside of it. The swaging head 9 can be turned and fastened to the body 8 in a position corresponding to the clearance angle of the tooth (FIG. 2).

Figure 7A:
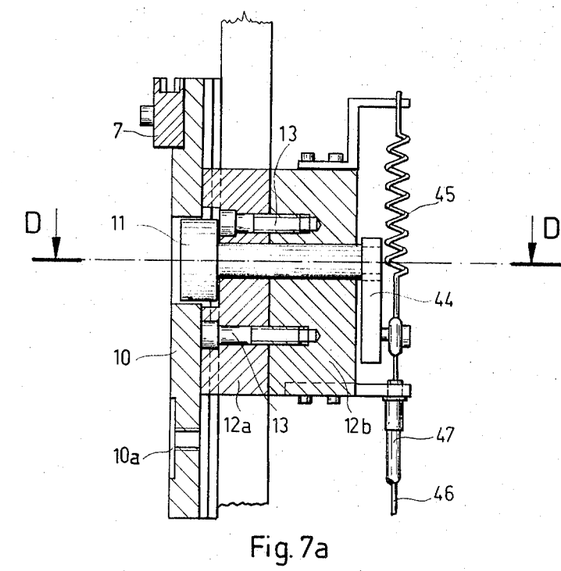
FIG. 7a is an enlarged cross sectional view taken along line C—C of FIG. 2.
Figure 7B:
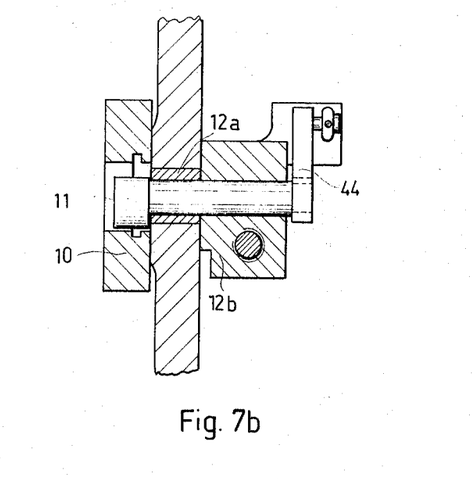
Figures 8A, 8B:
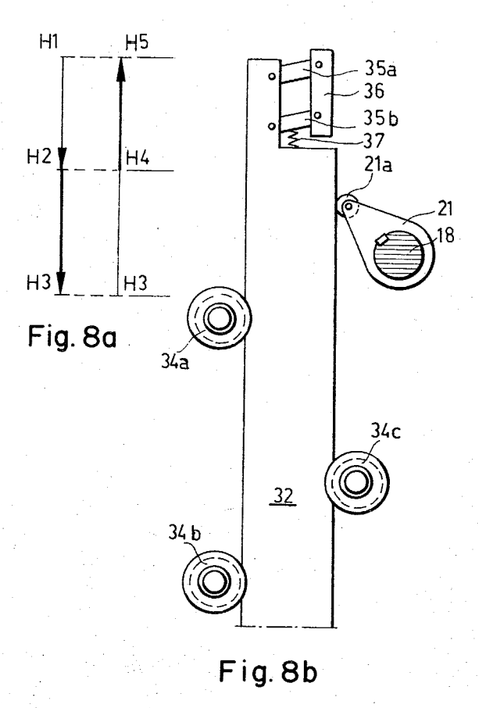
FIGS. 8a–8d schematically show the movements and operation of the driving bar of the machine.
Figure 8C:
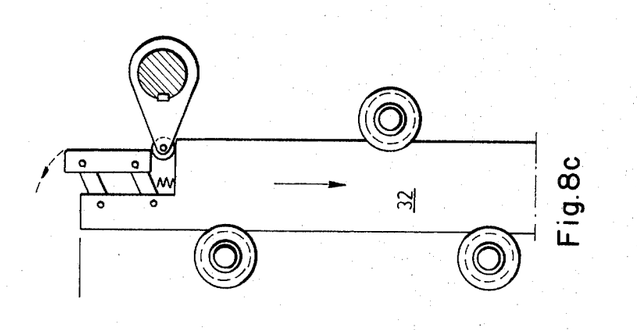
Figure 8D:
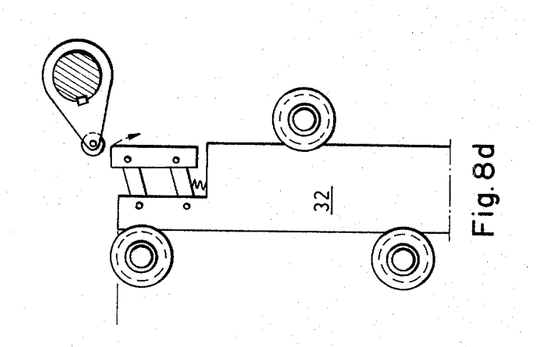

Part 10 shows the blade carriage having the blade holder 7 fastened to it by two bolts. Alternatively the holder supporting the circular saw blade at the center can be fastened to the blade carriage with a screw bolt in the recess 10 a (FIGS. 2 and 7a). The blade carriage 10 is joined by the flange-axle 11 to the slide 12 of the machine, which is fitted to move gliding tight in the vertical guiding slot 8a on the machine body. The slide is built of two parts 12a and 12b joined together by two bolts 13.

Figure 3:
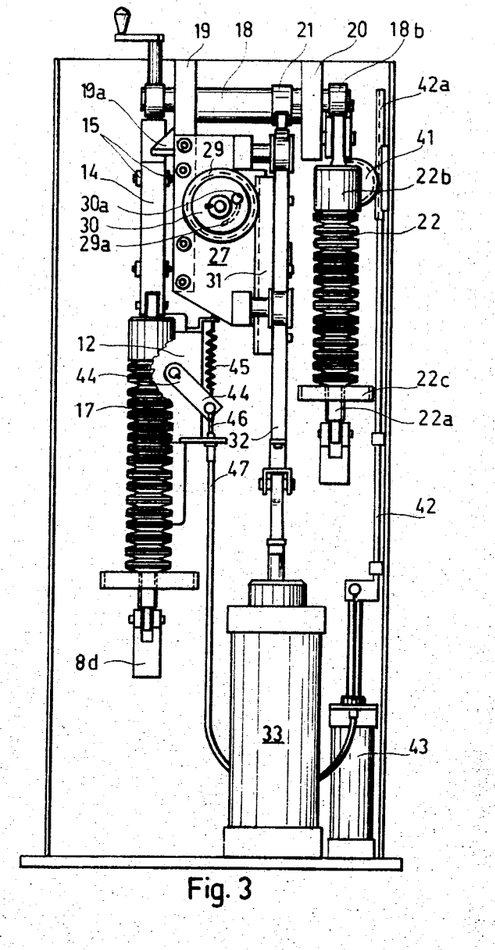
FIG. 3 shows a rear elevational view of the swaging machine shown in FIG. 2.
Figure 6:
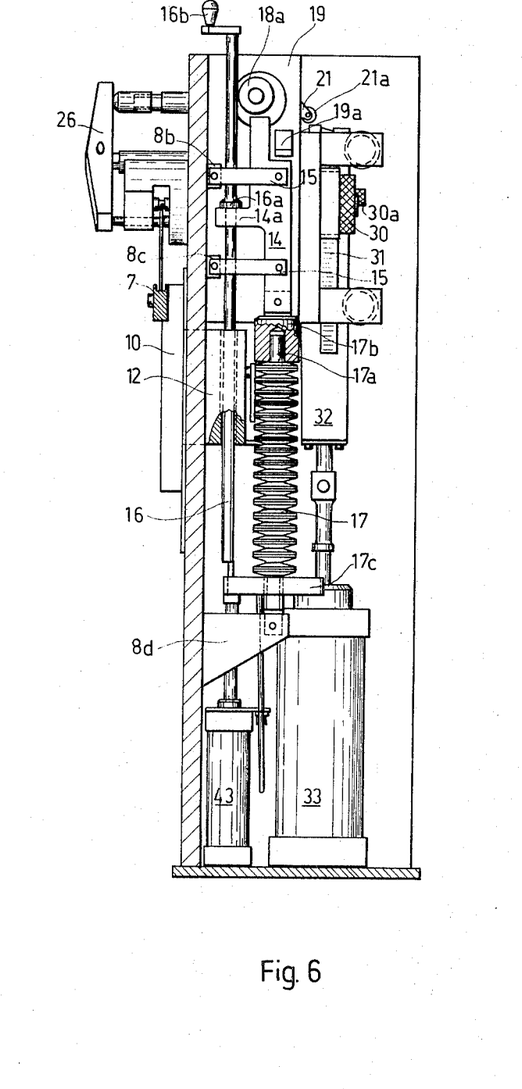
FIG. 6 is a side view of the machine taken along line A—A of FIG. 4.

FIGS. 3 and 6 show the members required for transmitting the power $P_1$ to the slide 12 and from here to the blade. The body part 14 of the spring arrangement, which will move vertically a few millimeters, is fastened to the projections 8b and 8c on the body 8 of the machine by means of four links 15 and taps. The slide 12 is supported by the screw 16, the flange 16a of which rests on the projection 14a of the body 14 of the spring arrangement. Turning the screw 16 by its crank 16b when the spring arrangement is in "open" position brings the slide to a distance where the blade tooth being swaged is in light contact with the eccenter 1 and the anvil 2. The spring organ itself consists of a cup spring package 17, inside of this a shaft 17a provided with threads at its lower end while its upper end is fitted to glide inside of the end piece 17b, as well as a cog wheel 17c serving as nut for stretching the springs. This spring member is in the manner shown in FIGS. 6 and 3 joined with bearings taps between the body part 14 of the spring arrangement and the support 8d projecting from the machine body 8.

In these figures the members affecting the blade are in "closed" position and the swaging movement has just been carried out by turning the eccenter 1 about 120°. For opening the spring arrangement the machine has an eccenter axle 18 (FIGS. 3 and 4) mounted to projections 19 and 20 on the body of the machine.

Figure 4:
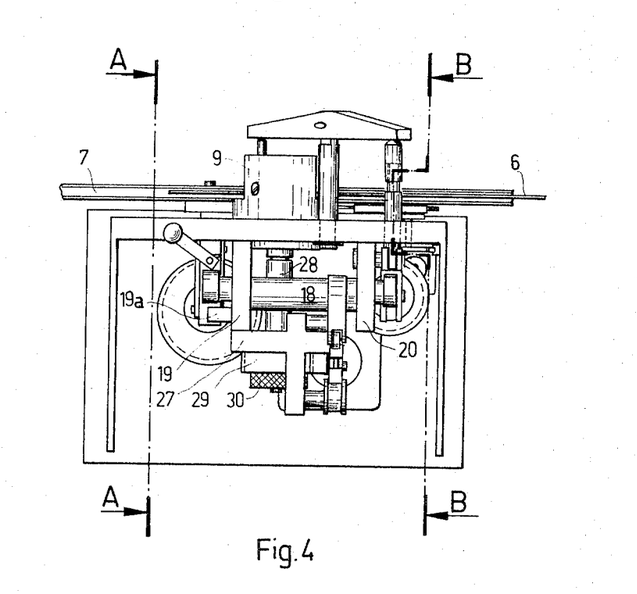
FIG. 4 shows a top planar view of the swaging machine shown in FIGS. 2 and 3.

The projection 19 has a bracket 19a against which the body part 14 of the spring arrangement rests if there is no blade in the machine and the organs are in "closed" position. For opening the fastening organs the eccenter axle 18 is turned (about 60°) by the crank 21 fixed to it, at which the roller 18a mounted eccentrically to the end of the axle presses the body 14 of the spring arrangement a couple of millimeters downward to relieve the blade at the same time from the pressure of the spring power $P_1$.

Figure 5:
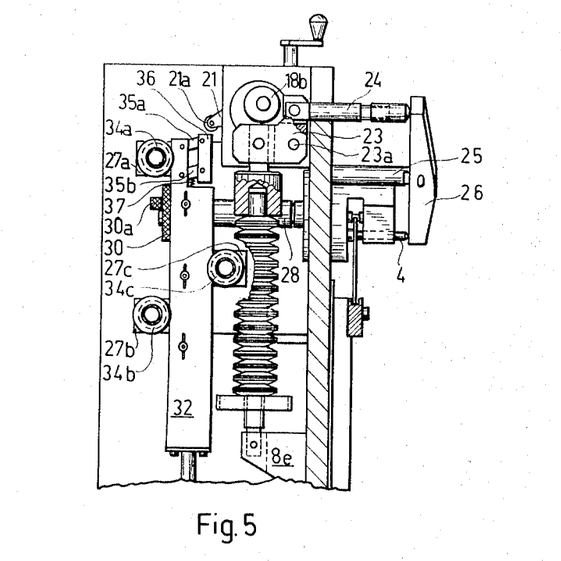
FIG. 5 shows an upper partial cross sectional view of the machine taken along line B—B of FIG. 4.

The members required for accomplishing and transmitting the side pressure power $P_2$ are explained by the FIGS. 3 and 5. The actual spring member 22 has entirely corresponding parts as the spring member 17 explained above, and it is fitted in the corresponding manner between the supporting projection 8e and the angular lever 23 using two bearing taps. The angular lever is fastened with the tap 23a to the bearing projection 20. A pressing axle 24 with its length adjustable according to the thickness of the blade is fastened to one branch of the angular lever through the body, which by means of the lever 26 mounted to the supporting pole 25 presses the mobile side support 4 of the blade by the power $P_2$. On turning the common eccenter axle 18 the side pressure opens at the same time as the pressure on the blade back, at which the eccenter roller 18b presses the spring arrangement 22 together. When there is no blade in the machine and the parts are in "closed" position, the part 22b rests against the projection 20.

Figure 9:
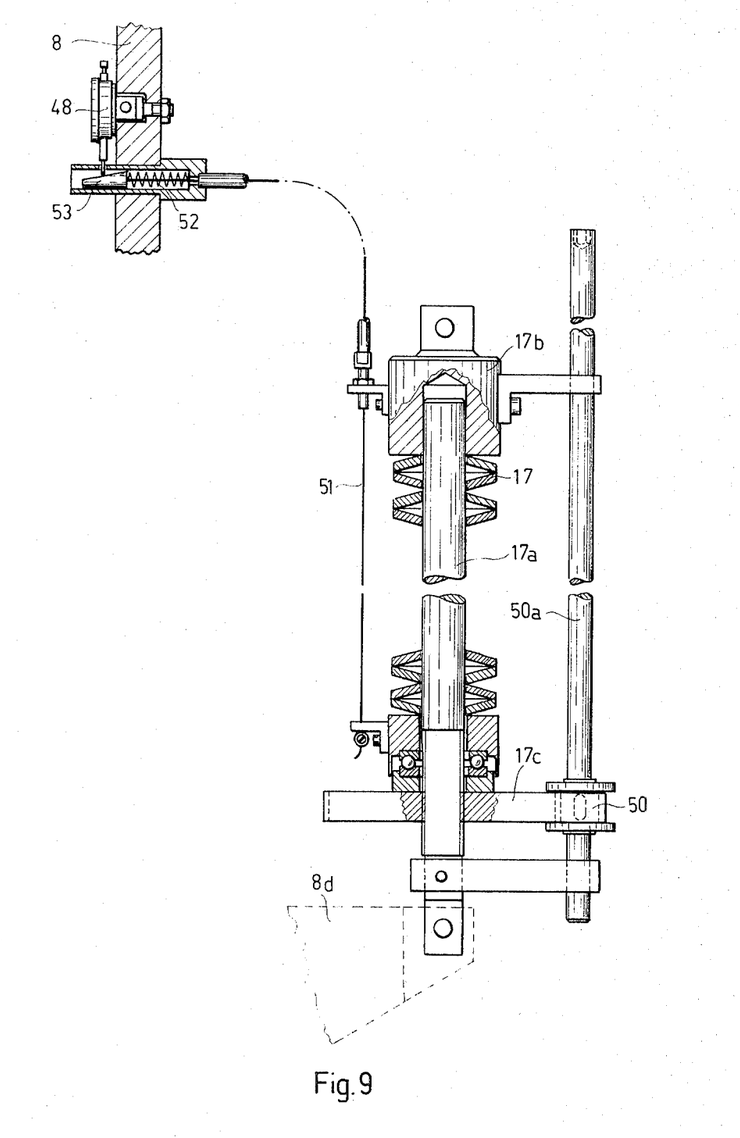
FIG. 9 schematically shows the spring arrangement of the machine and the spring force measurement by a dial gauge.

The spring powers $P_1$ and $P_2$ are read from the dial gauge 48 and 49 (FIG. 2), fastened to the front side of the machine at the upper part of it and derive their readings from the compression of the springs by means of tube wire and slide arrangement. The transmission ratios may be chosen for instance so that one revolution of the dial gauge 1 corresponds to 1,000 kp. The control of the spring powers and all details of the measuring members are not shown in the FIGS. 3–6, but they are illustrated further in FIG. 9. Here the regulation and measuring of the spring power $P_1$ from the actual spring organ 17 previously described is shown. The disc springs are strained by turning the cogwheel 17c serving as nut by means of the smaller cogwheel 50. This cogwheel is fixed in the manner shown in the figure to the shaft 50a, which from the upper part of the machine can be conveniently turned by a key. Turning is made easier with the aid of a pressure bearing placed between the disc springs and the cogwheel 17c. The compression of the springs is transmitted by means of the wire 51 and the spring 52 to the slide 53 and further to the dial gauge 48. The regulation and measuring of the spring power $P_2$ with the dial gauge 49 takes place in entirely corresponding manner.

The driving members of the machine are shown in the FIGS. 3, 4, 5 and 6. The body 27 of the driving device is rigidly fixed to the supporting projection 19 with the axle 28 turnably mounted to it, the other end of which is connected to the members in the swaging head 9 turning the eccenter axle 1. The cogwheel 29 is mounted to the other end of the axle 28 and the turning wheel 30 is fixed by a wedge to the axle. The fixed turning wheel 30 has a follower pin 30a fitting into the groove 29a, which is about 120° in length as shown with dotted lines in FIG. 3. The cogwheel 29 receives its motion from the cogged rod 31 fastened by three bolts to a point on the driving bar 32 of the machine dependent of the position of the swaging head 9, which driving bar in turn receives its motion from the pressure air cylinder 33. The driving bar moves on three guiding rollers 34a, 34b and 34c turnably mounted to corresponding projections 27a, 27b and 27c from the body 27 of the driving device. The program plate 36 is mounted to the upper part of the driving bar by means of two links 35c and 35b as well as four pivots, while a weak spring 37 is keeping it at a little distance from the upper end of the driving bar.

As the driving bar 32 is pushed upward (FIG. 5) the program plate 36 presses fast to the driving bar and forces the eccenter axle 18 to turn by means of the crank 21 and its roller 21a. During the first half of the movement of the driving bar 32 the fastening organs of the blade have reached "open" position and the cogwheel 29 has turned freely (120°). During the second half of the movement (also 120°) the cogwheel 29 turns with the aid of the follower pin 30a the fixed wheel 30 and further the eccentric die 1 returning this to its starting position. The machine is now able to perform on the same tooth a second swaging, or tooth switching and a new swaging. When the driving bar moves downward from its original position $H_1$ (FIG. 8) to the middle $H_2$ of the motion, the machine enters "closed" position as the program plate 36 escapes in front of the roller 21a and allows the eccenter axle 18 to release the spring arrangements to press the blade with the powers $P_1$ and $P_2$. During this time the cog wheel 29 has turned freely, but during the latter half $H_2$–$H_3$ of the motion of the driving bar 32 the cogwheel 29 turns by means of the follower pin 30a, the wheel 30 and the axle 28 the eccenter die 1 (120°) which performs the swaging. The motion upward of the driving bar 32, the opening of the machine between $H_3$–$H_4$, and the return of the eccenter die 1 between $H_4$–$H_5$, was described above already.

For moving the blade and switching a tooth a flange 38 (FIG. 2) in the upper part of the machine is provided with an axle going through the body 8, and a transferring finger 40 with adjustable length mounted to turn on a tap. To the axle of the flange 38 inside of the machine is mounted a cogwheel 41 (FIG. 3) driven by the cog rod 42a at the upper part of the transferring pole 42. The latter receives its reciprocating motion from the pressure-air cylinder 43.

The blade carriage 10 (FIG. 2) has to be lowered downwards when the machine is open, in order to be able to transfer a new tooth from below the eccenter die 1 to swaging position. This escape motion is accomplished by turning the flange-axle 11 in the slide 12 of the machine 90°. at which the blade carriage 10 is lowered about 1.5 cm (FIGS. 2, 3 and 7) on account of the segment cut out from the flange. Turning takes place by the crank 44 fixed to the other end of the flange-axle 11, aided by the spring 45. The crank 44 is drawn downwards to the position shown in the figures by means of the cable 46, which through the tubing 47 is brought beside the transferring pole 42 and fixed to this by its other end.

As the pressure-air cylinder 43 draws the transferring pole 42 downwards, the spring 45 is able to turn the flange-axle 11 with the aid of the crank 44, so that the blade carriage 10 and the blade 6 are lowered down (FIG. 2). At the same time the cog rod 42 turns the flange-axle 38 considerably more than half a round, owing to which the transferring finger 40 starts to push the blade when the blade carriage has started to drop, and the pushing movement ends when the blade is in its lowest position. The return movement of the parts and lifting the blade to swaging position takes place when the pressure-air cylinder 43 again pushes the transferring pole to the position presented in the figures.

For fully automatic operation the machine can be programmed, for instance, electrically either so that each tooth is swaged only once for several times before transferring the new tooth for swaging. As to details the machine may of course be built in many different ways.

Instead of pressure-air cylinders one may equally well use hydraulic cylinders, or the motions of the machine may be obtained by connecting rods from two gear motors.

Of the most important advantages of the machine, already proved by practical operation of a fully automatic prototype, the following still serves mentioning. As the fastening of the blade from the back or center and from the side as well is done by means of springs, the fastening power is always very even and just of the desired size, and the swaging die therefore unable to become overstrained even "by mistake". The automatic system of transfer required for switching tooth is simple and easy to adjust. Changing of blade in the machine is easy, the operation is fast and well suited for swaging all types and sizes of blades.

What I claim is:

1. A saw blade swaging machine of the type having a rotatable eccentric swaging die for swaging a saw blade and side pressing elements for engaging the side of the saw blade comprising a frame, carriage means moveably mounted on said frame, said carriage means defining a work path adapted to receive a saw blade, a rotatable eccentric swaging die mounted to said frame, blade engaging means mounted to said frame, said blade engaging means including side pressing elements, a first spring means mounted to said frame and connected to said carriage means, said first spring means being adapted to urge said carriage means toward said eccentric swaging die, a second spring means mounted to said frame and connected to said blade engaging means, said second spring means being adapted to urge at least one said side pressing element toward another side pressing element, and drive means mounted to said frame, said drive means being connected to said swaging die and adapted to rotate said swaging die and being adapted to engage and move said first and second spring means.

2. A swaging machine according to claim 1 wherein said first spring means comprises a spring assembly mounted to said frame, a carrier rod mounted on said spring assembly, said carriage means being movably mounted on said carrier rod.

3. A swaging machine according to claim 1 wherein said blade engaging means comprises a lever assembly mounted to said frame, said lever assembly including at least one moveable side pressing element, said second spring means being adapted to act on said lever assembly to exert a pressue on said at least one side pressing element.

4. A swaging machine according to claim 1 wherein said driving means comprises a body member mounted to said frame, an axle rotatably mounted in said body member, gear means mounted to one end of said axle, the other end of said axle being connected to said eccentric swaging die, a driving bar movably mounted on said frame, rack means secured to said driving bar, said rack means engaging said gear means and cooperating with said gear means to drive said gear means when said driving bar is moved, and motor means to move said driving bar.

5. A swaging machine according to claim 4 wherein said gear means comprises a cogwheel freely rotatably mounted on said axle, said cogwheel engaging and cooperating with said rack means to be rotated by said rack means, an axle drive wheel secured to said axle, said axle drive wheel defining a guide slot, a follower pin secured to said cogwheel and extending from said cogwheel through said guide slot, said follower pin being adapted to engage and rotate said drive wheel when said cogwheel is rotated.

6. A swaging machine according to claim 4 wherein said driving means further includes a rotatable eccentric axle mounted to said frame, and means to rotate said eccentric axle secured to said driving bar.

7. A swaging machine according to claim 1 including blade tooth switching means comprising a drive rod movably mounted to said frame, a rack member secured to said drive rod, a cogwheel rotatably mounted to said frame and adapted to engage and cooperate with said rack member and be rotatably driven by said rack member, a second drive means mounted to said frame, a flanged axle secured to said cogwheel, a transferring finger secured to said flanged axle, and said second drive means connected to said drive rod adapted to reciprocate said drive rod, so that the movement in one direction of said drive rod will serve to said carriage means and transferring finger to their starting positions.

8. A swaging machine according to claim 7 including carriage lowering means comprising an axle rotatably mounted to said frame adapted to be rotated by said second drive means against said carriage means to raise and lower said carriage means, said second drive means comprising a slide member, a third spring means connected to said slide member and secured to said axle, and cable means secured to said axle and said drive rod, said cable means comprising a tubular guide member and a cable moveably maintained in said tubular guide member.

9. A saw blade swaging machine comprising a frame, carriage means movably mounted on said frame, said carriage means defining a work path adapted to receive a saw blade, a rotatable eccentric swaging die mounted to said frame, saw blade engaging means mounted to said frame, said saw blade engaging means including side pressing elements, a first spring means mounted to said frame and connected to said carriage means, said first spring means being adapted to urge said carriage means toward said eccentric swaging die, a second spring means mounted to said frame and connected to said blade engaging means, said second spring means being adapted to urge said blade engaging means side pressing elements together, and drive means mounted to said frame, said drive means comprising a body member mounted to said frame, an axle mounted to said body member, gear means mounted to one end of said axle, the other end of said axle being connected to said swaging die, a driving bar means movably mounted on said frame, means on said driving bar means to engage and drive said gear means when said driving bar means is moved, motor means to move said driving bar means and an eccentric axle rotatably mounted to said frame, said driving bar means being adapted to engage and drive said eccentric axle, said eccentric axle when being driven being adapted to engage and move said first and second spring means.

10. A swaging machine as claimed in claim 9 wherein said first and second spring means each comprises a shaft mounted to said frame, an end member mounted to one end of said shaft, a cogwheel mounted axially spaced from said end member on said shaft, a plurality of cup springs mounted around said shaft between said end member and said cogwheel and a drive plate mounted to said end member.

* * * * *